(12) United States Patent
Zhang et al.

(10) Patent No.: US 9,703,896 B2
(45) Date of Patent: Jul. 11, 2017

(54) GENERATION OF CUSTOM MODULAR OBJECTS

(71) Applicant: MICROSOFT TECHNOLOGY LICENSING, LLC, Redmond, WA (US)

(72) Inventors: Haiyan Zhang, London (GB); James William Scott, Cambridge (GB); Nicolas Villar, Cambridge (GB); Greg Saul, London (GB); Alexandra Keeley Bunting, London (GB); Lee Jason Schuneman, London (GB); Philip Robert Harrison, Chalfont St Giles (GB); Thomas James Mejias Stott, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 13 days.

(21) Appl. No.: 14/203,991

(22) Filed: Mar. 11, 2014

(65) Prior Publication Data

US 2015/0258440 A1 Sep. 17, 2015

(51) Int. Cl.
*A63F 9/24* (2006.01)
*G06F 17/50* (2006.01)
*A63F 13/00* (2014.01)

(52) U.S. Cl.
CPC .............. *G06F 17/50* (2013.01); *A63F 13/00* (2013.01); *G06F 2217/02* (2013.01)

(58) Field of Classification Search
CPC ........ A63F 2009/246; A63F 2300/1043; A63F 13/08; A63F 13/69; A63F 13/53;
(Continued)

(56) References Cited

U.S. PATENT DOCUMENTS 6,149,490 A  11/2000 Hampton et al.
6,290,565 B1  9/2001 Galyean III et al.
(Continued)

FOREIGN PATENT DOCUMENTS

WO  0112285 A1  2/2001
WO  0169799 A2  9/2001
(Continued)

OTHER PUBLICATIONS

Schweikardt, Eric, "Designing Modular Robots", Nov. 19, 2013, Available at: http://www.cmu.edu/architecture/research/grad_work/2009_phdcd_schweikardt_eric.pdf.
(Continued)

*Primary Examiner* — Steve Rowland
(74) *Attorney, Agent, or Firm* — Alleman Hall Creasman & Tuttle LLP (57) ABSTRACT

A system for generating custom modular objects is described. The custom modules form part of a modular construction set from which an object can be created by a user. The object acts as a user input device for an interactive software experience. To generate a custom (i.e. non-standard) module, a virtual 3D shape is received by a module generation service. The service converts this shape into a derived 3D shape for the module, for example, ensuring that the module is shaped such that it is compatible with other modules from the modular construction set to which it will be connected for form an object and/or by adding an aperture for receiving a connector and/or electronics core. Once generated, the derived 3D shape is sent to the user in physical form or virtual form and a virtual representation of the module is provided to the interactive software experience.

20 Claims, 5 Drawing Sheets (58) Field of Classification Search
CPC .. A63F 2009/1016; A63F 13/02; A63F 13/24; G06F 17/50
See application file for complete search history.

(56) References Cited

U.S. PATENT DOCUMENTS

| | | | |
|---|---|---|---|
| 6,454,624 | B1 | 9/2002 | Duff et al. |
| 6,575,802 | B2 | 6/2003 | Yim et al. |
| 6,682,392 | B2 | 1/2004 | Chan |
| 6,773,322 | B2 | 8/2004 | Gabai et al. |
| 6,773,344 | B1 | 8/2004 | Gabai et al. |
| 6,954,659 | B2 | 10/2005 | Tushinsky et al. |
| 7,154,363 | B2 | 12/2006 | Hunts |
| 7,641,476 | B2 | 1/2010 | Didur et al. |
| 7,695,338 | B2 | 4/2010 | Dooley et al. |
| 8,079,846 | B1 | 12/2011 | Cookson |
| 8,087,939 | B2 | 1/2012 | Rohrbach et al. |
| 8,257,157 | B2 | 9/2012 | Polchin |
| 8,317,566 | B2 | 11/2012 | Ganz |
| 8,475,275 | B2 | 7/2013 | Weston et al. |
| 8,548,819 | B2 | 10/2013 | Chan et al. |
| 2001/0049249 | A1* | 12/2001 | Tachau ............ A63H 17/34 446/397 |
| 2005/0132290 | A1 | 6/2005 | Buchner et al. |
| 2007/0097832 | A1 | 5/2007 | Koivisto et al. |
| 2007/0198117 | A1 | 8/2007 | Wajihuddin |
| 2009/0081923 | A1 | 3/2009 | Dooley et al. |
| 2009/0197658 | A1* | 8/2009 | Polchin ............ A63F 13/02 463/9 |
| 2009/0291764 | A1 | 11/2009 | Kirkman et al. |
| 2009/0307592 | A1 | 12/2009 | Kalanithi et al. |
| 2010/0026458 | A1* | 2/2010 | Samdahl ............ G07F 17/3225 340/10.1 |
| 2010/0167623 | A1 | 7/2010 | Eyzaguirre et al. |
| 2011/0021109 | A1 | 1/2011 | Le et al. |
| 2012/0050198 | A1 | 3/2012 | Cannon |
| 2012/0122059 | A1 | 5/2012 | Schweikardt et al. |
| 2012/0286629 | A1 | 11/2012 | Johnson et al. |
| 2013/0109267 | A1 | 5/2013 | Schweikardt et al. |
| 2013/0109272 | A1 | 5/2013 | Rindlisbacher |
| 2013/0122753 | A1 | 5/2013 | Blakborn |
| 2013/0165223 | A1 | 6/2013 | Leyland et al. |
| 2013/0196770 | A1 | 8/2013 | Barney et al. |
| 2013/0288563 | A1 | 10/2013 | Zheng et al. |
| 2015/0004871 | A1* | 1/2015 | Laursen ............ A63H 33/08 446/124 |

FOREIGN PATENT DOCUMENTS

| | | |
|---|---|---|
| WO | 0169829 A2 | 9/2001 |
| WO | 2009037679 A1 | 3/2009 |
| WO | 2012160055 A1 | 11/2012 |

OTHER PUBLICATIONS

"Skylanders Swapforce", Sep. 11, 2013, Available at: http://www.skylanders.com/swapforce.

"Disney Infinity", Nov. 19, 2013, Available at: https://infinity.disney.com/en-gb.

"Cubelets", Sep. 11, 2013, Available at: http://www.modrobotics.com/.

"Shapeways", Nov. 19, 2013, Available at: http://shapeways.com/.

Lampe, et al., "The Augmented Knight's Castle—Integrating Mobile and Pervasive Computing Technologies into Traditional Toy Environments", Nov. 21, 2013, Available at: http://www.vs.inf.ethz.ch/publ/papers/mlampe-pg07-akc.pdf.

Kikin-Gil, Ruth, "BuddyBeads", Published on: Oct. 10, 2006, Available at: http://www.ruthkikin.com/Images/r.kikin-gil_thesis2005.pdf.

Fortmann, et al., "Illumee: Aesthetic Light Bracelet as a Wearable Information Display for Everyday Life", In Proceedings of ACM Conference on Pervasive and Ubiquitous Computing Adjunct Publication, Sep. 8, 2013, 4 pages.

Labrune, et al., "Telebeads: Social Network Mnemonics for Teenagers", In Proceedings of Conference on Interaction Design and Children, Jun. 7, 2006, 8 pages.

Ahde, et al., "Hello—Bracelets Communicating Nearby Presence of Friends", In Proceedings of the Tenth Anniversary Conference on Participatory Design, Sep. 30, 2008, 3 pages.

Kuniavsky, Mike, "Smart Things: Ubiquitous Computing User Experience Design", Sep., 2010, Available at: http://books.google.co.in/books?id=-WLyUCBBUVAC&pg=PA89&lpg=PA89&dq=Interactive+Smart+Beads+and+Bracelet&source=bl&ots=HA6ZA1Bssz&sig=x1s2X1pGZIe-5oVqX3uZA0jZ1ks&hl=en&sa=X&ei=BxWLUqSGI4X3rQfh9oDYCg&ved=0CFAQ6AEwBg#v=onepage&q=Interactive%20Smart%20Beads%20and%20Bracelet&f=false.

Robertson, Judy, "Encouraging Girls to Study Geeky Subjects (Part 2): Programmable Bracelets", Published on: Apr. 12, 2010, Available at: http://cacm.acm.org/blogs/blog-cacm/85132-encouraging-girls-to-study-geeky-subjects-part-2-programmable-bracelets/fulltext.

Lampe, et al., "Integrating Interactive Learning Experiences into Augmented Toy Environments", In Proceedings of the Pervasive Learning Workshop at the Pervasive Conference, May 2007, 8 pages.

"Seebo Platform", Published on: Jun. 22, 2013, Available at: http://www.seebo.com/.

Raffle, et al., "Topobo: A Constructive Assembly System with Kinetic Memory", In Proceedings of the SIGCHI Conference on Human Factors in Computing Systems, Apr. 24, 2004.

Schmid, et al., "Networking Smart Toys with Wireless ToyBridge and ToyTalk", In IEEE International Conference on Computer Communications, Apr. 10, 2011, 2 pages.

Patrizia, et al., "A Robotic Toy for Children with special needs: From requirements to Design", In IEEE 11th International Conference on Rehabilitation Robotics, Nov. 20, 2013, 6 pages.

Zaino, Jennifer, "JNFC Technology Brings New Life to Games", In Journal of RFID, Oct. 1, 2012, 10 pages.

"The NEX band", Jan. 3, 2014, Available at: http://www.mightycast.com.

* cited by examiner

GENERATION OF CUSTOM MODULAR OBJECTS

BACKGROUND

There are many ways that a user can interact with a computer game and typically a user controls the game via a keyboard and mouse, games controller (which may be handheld or detect body movement) or touch screen, dependent upon the platform on which the game is being played (e.g. computer, games console or handheld device). A number of games have also been developed in which gameplay is enabled (or unlocked) through the use of physical character toys which are placed on a custom base connected to a games console. By placing different toys on the custom base, different gameplay is enabled.

The embodiments described below are not limited to implementations which solve any or all of the disadvantages of known gaming systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

A system for generating custom modular objects is described. The custom modules form part of a modular construction set from which an object can be created by a user. The object acts as a user input device for an interactive software experience. To generate a custom (i.e. non-standard) module, a virtual 3D shape is received by a module generation service. The service converts this shape into a derived 3D shape for the module, for example, ensuring that the module is shaped such that it is compatible with other modules from the modular construction set to which it will be connected for form an object and/or adding an aperture for receiving a connector and/or electronics core. Once generated, the derived 3D shape is sent to the user in physical form or virtual form and a virtual representation of the module is provided to the interactive software experience.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

A system is described below which generates custom modular objects for use with an interactive software experience (such as a game). The system sends the generated modular object to a user in virtual or physical form and provides a virtual representation of the modular object to the interactive software experience. Where the generated object is sent to the user in physical form, the system may interface to a 3D printer to print the physical object.

The custom modular objects are physical modules which are each a sub-component of a coherent physical whole object, such as a toy. Once assembled, the coherent physical whole object is physically attached together to form a single object, i.e. requiring a deliberate action by the user to detach (e.g. an applied force to overcome a mechanical friction fit or a magnetic attachment holding the modules together, or an unclasping or threading action so that a module can be removed or disconnected from an adjacent module). This is in contrast to systems in which a module or modules are sensed to be near or touching one another, but no mechanical element holds them together (with the exception of gravity, if the whole assembly is only lifted vertically from underneath). The coherent physical whole object 108 is moveable freely (e.g. in three dimensions) by a user and is capable of communicating with the interactive software experience while it is in motion. The coherent physical object 108 (and/or the modules from which it is formed) may comprise mechanical articulation or movement affordances, e.g. it may have joints such as hinges, or some elements may be mobile compared to other elements, e.g. sliding or rotating with respect to one another.

The modules may be connected together and re-arranged by users as part of interaction with the interactive software experience (e.g. a game), with the object (once assembled from two or more modules, or in various examples, three or more modules) acting as a user input device for the interactive software experience. In some examples, the act of assembly of a plurality of modules by a user into a complete object unlocks or enables the interactive software experience or functionality within it (e.g. particular features, mini-games, levels, etc.). The virtual representation of the object, which is provided to (e.g. inserted into) the interactive software experience, is presented within the user interface (UI) of the interactive software experience and in various examples, the virtual representation may be a graphical representation which is displayed within a graphical user interface (GUI) of the interactive software experience.

Where the virtual representation is presented within a 3D display or tangible display, it will be appreciated that the representation is transformed into a real representation when it is presented.

Figure 1:
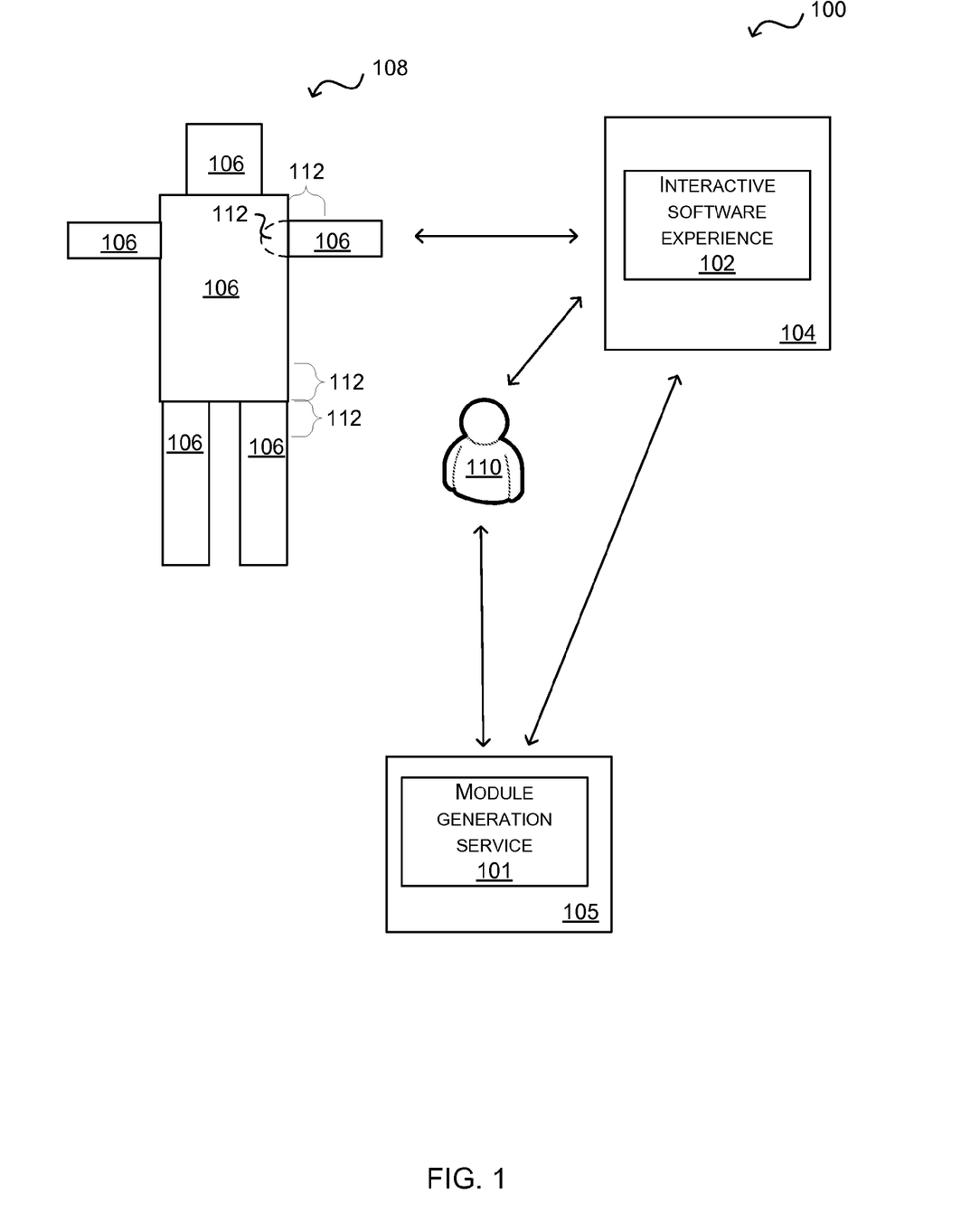
FIG. 1 is a schematic diagram of an example system comprising a module generation service which generates custom modular objects for use with an interactive software experience.

FIG. 1 is a schematic diagram of a system 100 comprising a module generation service 101 which generates custom modular objects for use with an interactive software experience 102. The interactive software experience 102 interacts with an object 108 formed from a plurality of physical modules 106 such that the physical object 108 acts as a user input device for the interactive software experience 102 and a virtual representation of the object is presented within a UI of the interactive software experience 102. A physical module 106 may be generated by the module generation service 101 based on a virtual 3D shape generated by a user 110, or it may be any other module created in a different way (e.g. one of a range of mass-produced, off-the-shelf modules where the end user was not involved in its creative design or manufacture). The virtual 3D shape generated by the user 110 may be communicated to the module generation service 101 by the interactive software experience 102 or via alternative means (e.g. by email, via a web interface, via an application running on a computing-based device operated by the user, etc.).

The interactive software experience 102 runs on a computing-based device 104 and the module generation service 101 runs on a computing-based device 105. In various examples, both the interactive software experience 102 and the module generation service 101 may run on the same computing-based device. In other examples, the module generation service 101 may run on a remote computing-based device 105, such as a remote (e.g. cloud) server.

The interactive software experience 102 may, for example, be a game, social media application, personal organization application (e.g. which enables one or more users to set out a family/work schedule through physical tokens in the form of modules which represent particular tasks), multimedia application (e.g. which allows a user to compose photographs and music represented by physical tokens in the form of modules into a slideshow/movie for sharing), etc. The interactive software experience 102 comprises device-executable instructions, which when executed implement the features of the experience, some of which are described herein, and these device-executable instructions may be stored on the computing-based device 104 or may be stored remotely. Similarly, the module generation service 101 comprises device-executable instructions, which when executed implement the features of the service (as described herein) and these device-executable instructions may be stored on the computing-based device 105 or may be stored remotely.

Although FIG. 1 shows a single object 108, a single interactive software experience 102, a single computing-based device 104 and a single module generation service 101, in other examples there may be more than one object 108 which interacts with the interactive software experience 102, multiple computing-based devices 104, 105, multiple interactive software experiences 102, and/or multiple module generation services 101.

Figure 2:
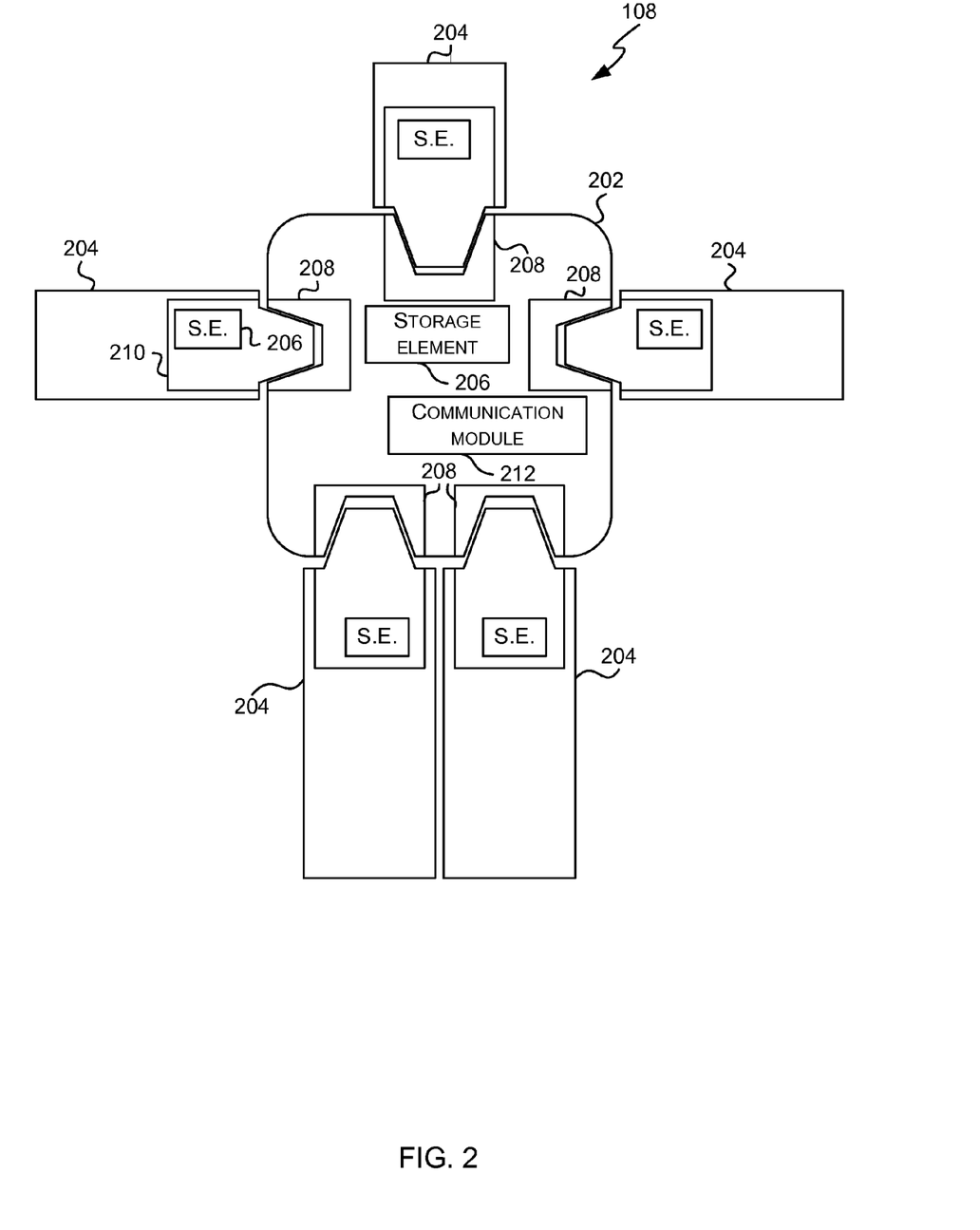
FIG. 2 shows an enlarged view of the coherent physical whole object shown in FIG. 1.

FIG. 2 shows an enlarged view of the coherent physical whole object 108 shown in FIG. 1. It can be seen in FIG. 2 that each module 106, 202, 204 comprises a storage element 206 (e.g. a memory) and one or more connectors 208, 210. The connectors 208, 210 physically attach the modules 106, 202, 204 together and may also pass data and power between modules. The storage element 206 which may be integrated within a connector (e.g. as shown in module 204 in FIG. 2) or separate from a connector (e.g. as shown in module 202 in FIG. 2), is arranged to store the ID of the module (the module ID 112) and may also store other data, such as the owner ID, or other data relating to the module (module data). The module IDs are used by the interactive software experience 102 to identify which modules 106 have been used to form the object 108 and this then affects the operation (or behavior) of the interactive software experience 102. As described above, once assembled by a user from the modules 106, 202, 204, the coherent physical whole object 108 is physically attached together to form a single object, i.e. requiring a deliberate action by the user to detach (e.g. an applied force to overcome a mechanical friction fit or a magnetic attachment holding the modules together).

The modules 106, 202, 204 may, for example, represent parts (e.g. head, body, limbs) of a humanoid/animal/mystical character (e.g. a human, animal or robot), vehicles or parts thereof (e.g. chassis, wheels, roof, etc.), accessories for a vehicle or character (e.g. weapons, clothing, armor, or other objects which the character may wear/carry/hold), tracks (e.g. for a car, train, human, animal or other mobile object), bricks (e.g. as part of a construction set), baseboards or levels (e.g. where the tracks/bricks/baseboards/levels may form part of a playset such as a train set, model village, tower block, dolls house or other construction) or parts of an educational toy (e.g. parts of a molecular model, skeleton or body, etc.).

At least one of the modules 106, 202, 204 in the coherent physical whole object 108 comprises a communications module 212 which enables the module 202 to communicate with the interactive software experience 102. Any suitable communication technology may be used, including wireless technologies (e.g. Bluetooth®, Bluetooth® Low Energy, BLE, WiFi™ or WiFi™ Direct, Near Field Communication (NFC), 802.15.4, etc.) and wired technologies. The communications module 212 may communicate directly with the computing device 104 running the interactive software experience 102 (e.g. smartphone, tablet computer, games console, etc.) or may communicate via a network (e.g. a home network or the internet) or intermediary device (e.g. a wireless access point) or intermediary server (e.g. cloud server).

The information which is communicated from the coherent physical whole object 108 to the interactive software experience 102 (via the communication module 212) comprises the IDs of the modules 106, 202, 204 and may also comprise information about their arrangement (which may be referred to as topology information), sensor data (if any of the modules include sensors), some or all of the module data stored in the modules, etc. Where only one of the modules comprises a communication module 212 (e.g. as shown in FIG. 2) this module 202 (which may be referred to as a core module) may aggregate the data for the other modules 204 in the object 108 (which may be referred to as peripheral modules) and send the aggregated data to the interactive software experience 102. Where each module comprises a communication module, each module may communicate data about itself to the interactive software experience 102. In other examples, any module that comprises a communication module 212 may send its own data and optionally data for one or more other modules within the object 108.

In various examples, one or more of the modules (e.g. a module 202 which also comprises a communication module 212) may also comprise a processor arranged to collect the IDs of other modules (e.g. all modules or a subset of modules) connected to form the coherent physical whole 108 and to collect other data from each of the modules. The processor may be a microprocessor, controller or any other suitable type of processor for processing computer executable instructions to control the operation of the core module in order to collect data from connected modules. In various examples, the data may be collected by a core module from each of the connected modules directly (e.g. via a bus which is electrically connected via the connectors or other means, such as using NFC, QR codes or computer vision). In other examples, however, each module may collect information on its neighbors such that a core module aggregates the data provided by its direct neighbor modules.

It will be appreciated that the modules 106, 202, 204 may comprise additional elements not shown in FIG. 2, such as batteries, sensors, actuators, displays, additional hardware logic, etc. It will further be appreciated that although FIGS. 1 and 2 show one module 106, 202 as a robot body and the other modules 106, 204 as the head and limbs, each of the modules can have any physical form factor (e.g. any shape of external housing) which is compatible with the other modules (i.e. each module is shaped such that it can connect to at least one other module, without the outer housing clashing).

Figure 3:
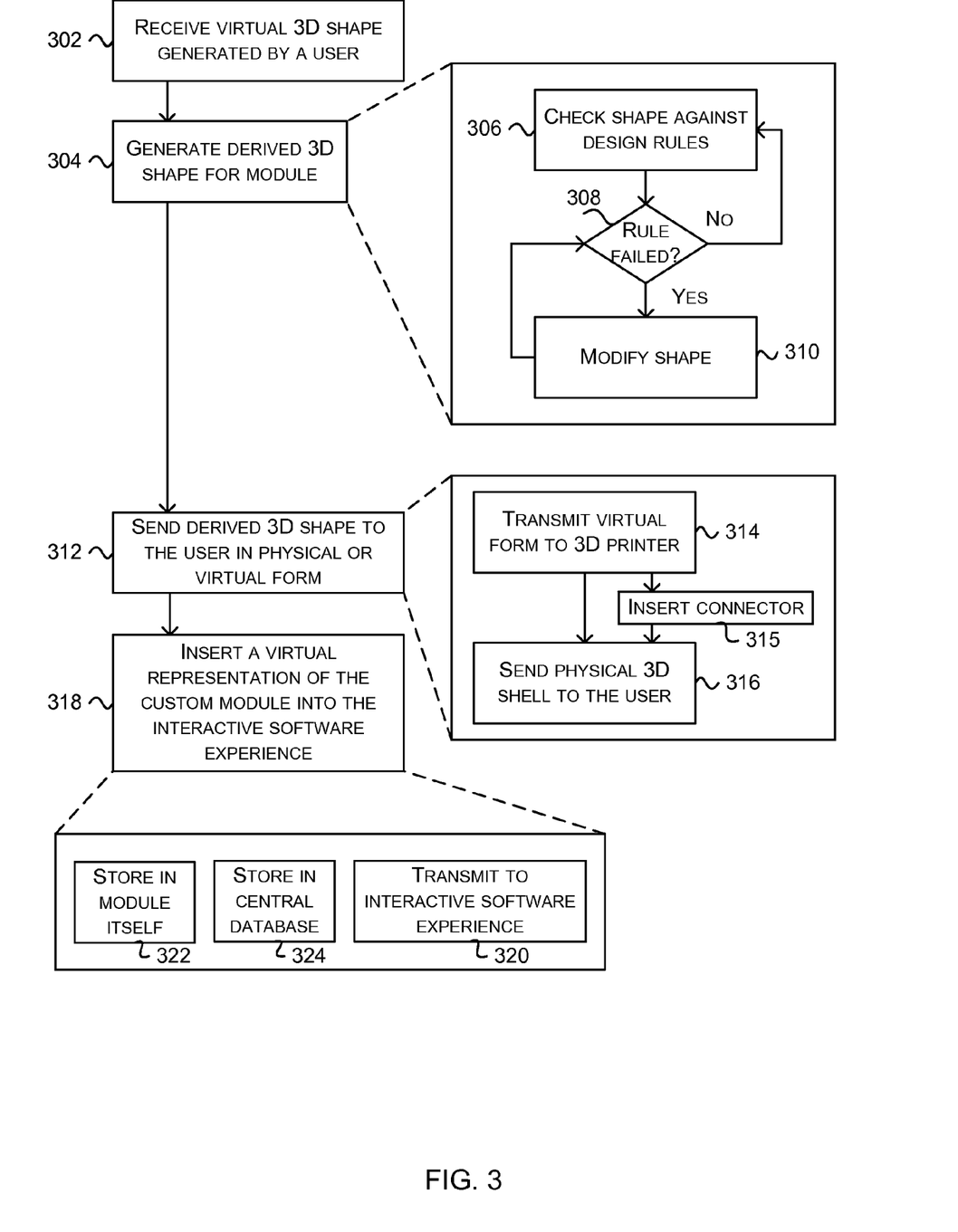
FIG. 3 which is a flow diagram showing an example method of operation of the module generation service shown in FIG. 1.

The operation of the system 100 shown in FIG. 1 may be described with reference to FIG. 3 which is a flow diagram showing an example method of operation of the module generation service 101. As shown in FIG. 3, the module generation service 101 receives a virtual 3D shape for a custom modular object (or custom module) which has been generated by a user (block 302). There are many ways that this virtual 3D shape may be received and in various examples it may be received from an interactive software experience 102 or via other means, such as by email, via a web interface, via an application running on a computing-based device operated by the user, by transferring a link to the file location on a file server or web server, through physical delivery e.g. by posting a flash memory device, etc.

The generation of the virtual 3D shape by the user may be achieved in many different ways. In various examples, the virtual 3D shape may be generated by artistic input, e.g. the user may actively and explicitly design the virtual 3D shape (e.g. within a drawing application). This may be performed within the interactive software experience 102, within a GUI provided by the module generation service 101, or within an application (e.g. a dedicated drawing application) running on a computer-based device to which the user has access (which may be computing-based device 104 or another computing-based device not shown in FIG. 1).

In other examples, the generation of the virtual 3D shape may be a consequence of a user's interaction with an interactive software experience 102, such that the user does not explicitly design the actual virtual 3D shape. In such an example, the virtual 3D shape may be generated by the interactive software experience 102 based user interaction with the experience, for example, based on achievements, activities, progress, etc. within the interactive software experience.

Where the interactive software experience is a game, the user may generate the virtual 3D shape by game play. For example, where the object is a character in a virtual world and a user progresses through the game, the character may gain strength points, characteristics, powers, skills or virtual assets (e.g. armor, clothing, etc.), and the characters (or their virtual assets) may have interactions with the storyline, with other characters (controlled by players or "non-player" characters) or the game environment. Any or all of these may be reflected in the virtual 3D shape of one or more modules forming the object (e.g. an arm module depicting larger muscles, a new weapon module, battle scars on the character or their armor, pale skin from inhabiting shady/dark virtual environments e.g. caves, etc.). In such an example, the user has not actively designed the new module (and hence the virtual 3D shape of the custom module), but instead it is created within game as a direct consequence of the user's game play and so is still generated by the user. In different examples, the interactive software experience may be a personal information manager, and the generated shapes may reflect their schedule (e.g. Wednesdays may be "wide" due to lots of appointments that day) or their contacts (e.g. generating representations of contacts or contact groups that can be used to help organize/browse such contacts).

In further examples, the user may generate the virtual 3D shape by scanning a real-world object with a depth (or other suitable) camera (e.g. which may be attached to the computing-based device 104 in FIG. 1). This scanning functionality may be provided within the interactive software experience 102, within a UI provided by the module generation service 101 or within an application running on a computer-based device to which the user has access (which may be computing-based device 104 or another computing-based device not shown in FIG. 1). For example, where the computing-based device 104 is a games console, a camera which is used for tracking the motion of the user (e.g. a Microsoft® Kinect® camera) may also be used to scan a real-world object.

In yet further examples, the user may generate the virtual 3D shape by selecting from example designs (or parts thereof) made available to the user 110 by the module generation service 101 or the interactive software experience 102. Such example designs may have been generated by the user themself or by other users, or they may be generated by the software experience either "from scratch" (i.e. algorithmically), from preset templates, or by using existing designs as templates and varying them either randomly or programmatically (e.g. showing the user auto-generated "mashups" of their friends' previous designs). In various examples, a user may be presented with images of a number of previous designs and a UI may be provided to enable the user to select all of a previous design or to select parts of previous designs and combine them to form one new virtual 3D shape.

In other examples, a user may generate the virtual 3D shape by selecting one or more characteristics that they wish the resultant custom module to have. These characteristics may, for example, be selected within an interactive software experience 102 (e.g. within a game) and reflect aspects of the experience (e.g. aspects of game play). For example, a user may select a strength value, a power value, a beauty value, etc. and the interactive software experience may generate a virtual 3D shape based on the selected values.

Having received a virtual 3D shape generated by a user (in block 302), the module generation service 101 generates a derived 3D shape for a module based on the received virtual 3D shape (block 304). The derived 3D shape which is generated (in block 304) has generally the same outer visual appearance (and physical shape) as the virtual 3D shape generated by the user but may be modified by the module generation service 101 in one or more ways as described below. For example, each module comprises a connecting surface/region 112 (e.g. the portion of a module 106 which abuts a neighboring module 106) and the part of the virtual 3D shape in the connecting surface/region 112 may be modified in generating the derived 3D shape. As described in more detail below, the derived 3D shape may comprise an orifice (or opening or aperture) for inserting connectors 208, 210, electronics (e.g. storage element 206, communications module 212, a processor, etc.), etc. The derived 3D shape may be a hollow structure or a solid (i.e. not hollow) structure.

In various examples a derived 3D shape which is generated (in block 304) may be shaped to be compatible with other modules to which the custom module will be connected to form a coherent physical whole. In various examples, each derived 3D shape may be shaped to be compatible with all other modules and in other examples, a derived 3D shape may be shaped to be compatible with a set of modules (but not all other modules). For example, where the custom module is a limb or head module which is to connect to a body module, the derived 3D shape may be shaped to be compatible with all body modules. In another example, where the custom module is an accessory for a vehicle or character, the derived 3D shape may be shaped to be compatible with any modules to which the accessory can be connected to (e.g. a sword module may be shaped to be compatible with all arm modules, an armor module may be shaped to be compatible with all body modules). In various examples, modules may be part of sets as a consequence of characteristics of the modules, e.g. a set of orc modules (e.g. head, body, limbs), a set of vehicle modules (e.g. chassis, wheels), etc. In such examples, the derived 3D shape may be shaped to be compatible with other modules within the set (but not necessarily shaped to be compatible with modules in other, non-overlapping sets).

The generation of a derived 3D shape which is shaped to be compatible with other modules to which the custom module will be connected to form a coherent physical whole (in block 304) may, for example, be performed by checking that none of the 3D shape protrudes beyond the connecting surface such that it would clash with an adjoining module. This may be performed by checking the received virtual 3D design again a set of predefined design rules (block 306) and if a rule is failed or violated ('Yes' in block 308), modifying the shape (block 310) and then re-checking against the rule (block 308). As shown in FIG. 3, this may be an iterative process whereby the shape is checked against a series of rules in turn.

In various examples the virtual 3D shape which is received may be modified when generating the derived 3D shape to provide an orifice to receive a connector (e.g. connector 208, 210 as shown in FIG. 2) or a connector and electronics core (e.g. comprising a storage element 206 and communication module 212, as shown in FIG. 2). Once inserted into the derived 3D shape (by the user or a third party), the connector enables the module to be physically connected to other modules and may also pass power and/or data between modules (as described above). The generation of a derived 3D shape which is shaped to provide an orifice to receive a connector and/or electronics core (in block 304) may, for example, be performed by adding a stored feature from a library to the received virtual 3D shape, the stored feature corresponding to the orifice for a connector and/or electronics core.

In various examples, the virtual 3D shape which is received (in block 302) may be segmented into two or more custom modules, i.e. two or more derived 3D shapes (in block 304). The segmentation may be performed automatically (e.g. based on one or more predefined criteria) and may be performed where the virtual 3D shape which is received exceeds a predefined size or dimension and/or where it has a shape that would otherwise be difficult to generate in physical form (e.g. using a 3D printer). As described in U.S. patent application Ser. No. 13/972,731 entitled 'OPTIMIZING 3D PRINTING USING SEGMENTION OR AGGREGATION' (filed 21 Aug. 2013) which is incorporated herein by reference in its entirety, there are many different ways by which the segmentation may be performed. In an example an algorithm may be used which creates dividing planes between parts of the virtual 3D shape based on uniformly distributing the mass (so each sub-object occupies a similar volume of raw material regardless of shape for printing). Another example may use a segmentation strategy which optimizes the separation into smaller sub-objects to reduce the maximum dimensions of each sub-object such that they fit the printer build envelope. A further example may slice tall objects into thick sub-slices. Some object division strategies may analyze the structural form of large objects and select dividing points which enable easy rejoining/connecting/assembly or even additional connector mechanisms (as described below) to be added such as screw threads or inserts/pegs. Optimizing using Finite Elements Analysis may be used to ensure each sub-object is mechanically sound and not overly weakened by division. Many strategies may involve mechanical/structural optimization to avoid undesirable artifacts such as slivers of materials etc. It will be appreciated that different segmentation methods may be used for different types/shapes of objects and in some examples, combinations of methods may be used. In the case of segmentation as part of generation of custom modules that are compatible with existing modular objects, such segmentation benefits from taking into account this compatibility in considering where to segment (e.g. if existing modular objects have arms and torso separate, but not forearm and upper arm, then the segmentation of a custom object should be also separate the arm and torso but not divide the arm into forearm and upper arm), and how to segment (e.g. to ensure that a segmentation into forearm and torso is done such that the forearm is compatible with other preexisting torsos and the torso compatible with preexisting arms).

Having generated the derived 3D shape for the custom module (in block 304), the module generation service 101 triggers the sending of the derived 3D shape to the user in virtual or physical form (block 312). Where the derived 3D shape is sent to the user in physical form, this may comprise transmitting the virtual form of the derived 3D shape to a 3D printer (block 314) and then triggering the sending of the physical form of the derived 3D shape (created by the 3D printer in block 314) to the user (block 316), e.g. via the postal system. This may, for example, comprise automatically generating the shipping paperwork (e.g. labels, accompanying paperwork, invoice, etc.), so that a person or a machine can package the physical derived 3D shape and then ship it to the user. In other examples, the virtual form of the derived 3D shape may be transmitted to one of a distributed network of 3D printers (in block 314), where the particular 3D printer used may be selected based on the location (or other attribute) of the user and/or other parameters (e.g. availability or capability of the 3D printer) and then a user may be notified of the location of the 3D printer (e.g. by email) so that they can collect the derived 3D shape in physical form (e.g. from a shop where they will then pay for the physical form upon collection). Alternatively, the derived 3D shape may be sent to the user (e.g. via the postal system), as described above. In examples where the generated derived 3D shape comprises an orifice for a connector and/or an electronics core, these may be inserted (block 315) prior to the shipping of the physical derived 3D shape to the user (in block 316), prior to collection of the physical derived 3D shape by the user or alternatively the user may insert any required connector and/or electronics core themselves. In other examples, the virtual form of the derived 3D shape may be sent to the user (in block 312) so that the user can generate (e.g. 3D print) the physical form and in such examples, the virtual form of the derived 3D shape may be sent to the user in any way (e.g. by email, by placing it on a server for download by the user, on physical media sent through the postal system, etc.).

As well as sending the derived 3D shape to the user (in block 312), the module generation service 101 also provides a virtual representation of the custom module to the interactive software experience 102 (block 318). The virtual representation may comprise the graphical data (e.g. images, 2D or 3D model, colors, textures, patterns, etc.) that is required by the interactive software experience in order that the module can be displayed within its GUI. In various examples, the virtual representation may comprise (in addition to or instead of a graphical or visual representation) a sonic, audio or haptic representation (e.g. olfactory representation, vibration pattern), etc. In various examples, the virtual representation may comprise a tangible representation (e.g. for tangible UIs), representations as filters or operations which act upon other elements (e.g. adding blurring, adding color, changing the audio, adding or removing dynamic behavior, making stronger or weaker colors/smells, etc.).

The provision of a virtual representation (in block 318) may be achieved by transmitting the virtual representation to the interactive software experience (block 320) but may alternatively be achieved in different ways. In examples where the custom module comprises a storage element (e.g. storage element 206 as shown in FIG. 2), the virtual representation may be stored in (e.g. written to) the storage element (block 322) e.g. prior to inserting the connector/electronics core comprising the storage element in block 315 or after the insertion of the connector/electronics core in block 315 and prior to shipping in block 316. Alternatively, the virtual representation may be sent to the user (along with the derived 3D shape) so that the user can store it in the module (in block 322), e.g. where the user inserts the connector/electronics core into the physical 3D shape. In examples where the interactive software experience 102 communicates with a central database, the virtual representation may be stored in (e.g. written to) this database (block 324).

In various examples, additional information about the custom module may be provided to the interactive software experience 102 along with the virtual representation. This additional information may, for example, include properties of the module (e.g. physical properties which may be interpreted by a physics engine within the interactive software experience, although in various examples these may be considered part of the virtual representation). Such additional information may also include the virtual 3D shape (as generated by the user) or the derived 3D shape (as generated by the system) of the module, enabling further custom designs to be made based on that module. In examples where the virtual 3D shape received (in block 302) is segmented to form more than one custom module, additional information may be provided to the interactive software experience to indicate that each of these custom modules were generated from the same virtual 3D shape. This may, for example, prevent them from being used with other modules and/or provide enhanced functionality within the interactive software experience 102 where they are used together.

Figure 4:
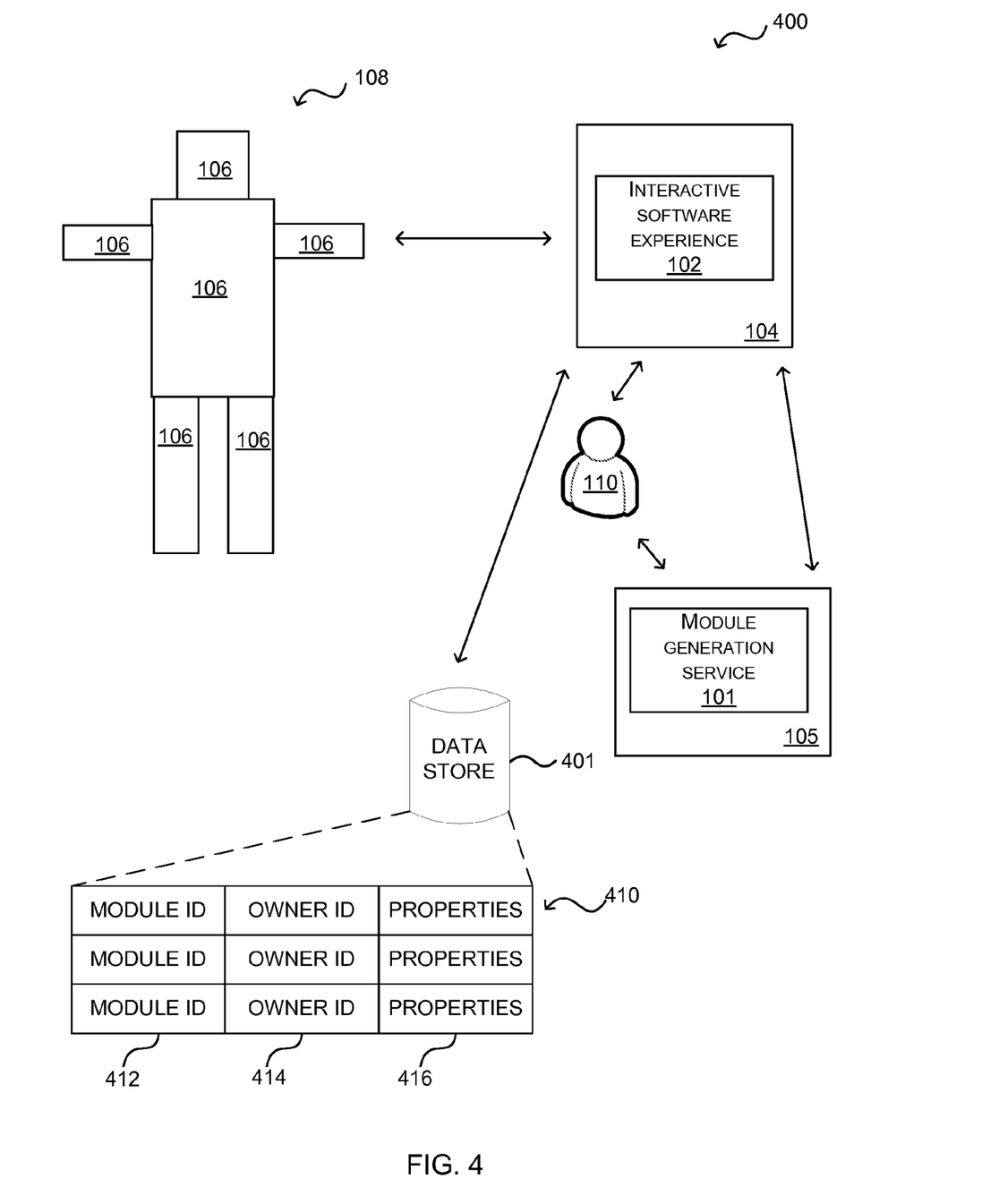
FIG. 4 is a schematic diagram of another example system comprising a module generation service which generates custom modular objects for use with an interactive software experience.

FIG. 4 is a schematic diagram of another system 400 comprising a module generation service 101 which generates custom modular objects for use with an interactive software experience 102. In addition to the features shown in FIG. 1 and described above, this system 400 comprises a data store 401. The data store 401 comprises a number of data records 410, each record being associated with a physical module 106 (which may be a standard module or a custom module) and comprising a module ID 412 (i.e. an identifier for the module), an owner ID 414 (i.e. an identifier for the owner of the module) and one or more properties of the module 416 (which may, for example, include a virtual representation of the module). In various examples, at least one of the module ID 412 and owner ID 414 fields are verified by an authentication service. The data store 401 provides an interface to enable an interactive software experience 102 (such as a game) to check one or more records 410 and this check may trigger a change in the behavior of the interactive software experience 102, or may cause other actions such as changes to the data in the data store (e.g. recording history of use of the toy). The checking may be performed by the interactive software experience 102 or the data store 401 itself (in response to a request by the interactive software experience 102). Records in the data store may be updated by the interactive software experience 102, a module 106 (e.g. the module to which the record relates or another module), the user 110 or another application.

In examples of the method of FIG. 3 where the module generation service 101 stores the virtual representation of the custom module in the data store 401 (in block 324), this virtual representation may be stored within a properties field 416 within a new data record 410 within the data store 401, with the data record 410 also comprising an identifier 412 for the custom module and an owner ID 414 which may, for example, be an identifier for the user 110 which generated the virtual 3D shape (received in block 302) and to whom the generated derived 3D shape is sent (in block 312).

In various examples, the custom module which is generated by the method shown in FIG. 3 may be a replacement for an old module, e.g. where the custom module has a modified (e.g. upgraded) physical appearance but otherwise functions as if it was the old module which it replaces. In such an instance, the virtual representation of the custom module may be stored (in block 324) in a properties field 416 of an existing record 410 (corresponding to the old module) and where the module ID 414 of the replacement module does not match the module ID of the old module, the module ID 414 may also be updated within the data entry. Where the module ID 414 for a module is stored within the module itself (e.g. within the connector or electronics core), the module ID may be transferred from the old module to the replacement module by the user (or a third party) taking the connector or electronics core out of the old module and placing it in the replacement module. Alternatively, a new data record 410 (with a new module ID 414) may be created comprising the new visual representation (in a properties field 416), the owner ID copied from the data record of the old module and any other properties fields copied from the data record of the old module.

Where properties data is transferred from one data record (corresponding to an old module) to a new data record (corresponding to the replacement module), this may be performed by the data store 401 at the request of the module generation service 101. Alternatively it may be performed by the data store 401 at the request of the user 110. Where the user requests the transfer, the data store may verify credentials provided by the user before initiating the transfer (e.g. to check that the user is permitted to transfer the data from the old data record to the new data record). In various examples, these credentials may be provided to the user at the same time as (or in parallel to) sending the user the derived 3D shape in virtual or physical form (in block 312).

In various examples, the method of FIG. 3 may be triggered by a user, e.g. when a user clicks a button within the interactive software experience 102 or within a UI provided by the module generation service 101 or when a user uploads a virtual 3D shape to the module generation service 101. In other examples, however, the method may be performed automatically without any explicit user input to trigger it. As described above, in some examples, the virtual 3D shape is generated by the user a consequence of their interaction with an interactive software experience 102, such that the user does not explicitly design the actual virtual 3D shape. In such an example, the interactive software experience may trigger the method of FIG. 3 (e.g. by providing the virtual 3D shape to the module generation service 101) based on the user's progress or activity within the interactive software experience 102. For example, the generation of the custom module may be triggered by the interactive software experience as a reward for the user for attaining a particular level of success. In further examples, the method of FIG. 3 may be triggered as a result of a sale of a module by a user. In such an example, the physical module may not be transferred from the seller to the buyer but instead a copy of the module may be generated using the methods described herein and sent to the buyer (in physical or virtual form). Where the system comprises a data store 401 (as shown in FIG. 4 and described above), the data record associated with the module being sold may be updated to disable it or to factory reset it and a new data record may be generated for the newly created copy of the module comprising some or all of the property data from the module being sold.

As described above, the user may generate the virtual 3D shape by selecting from previous designs (or parts thereof) that have been generated by other users and which may be made available to the user 110 by the module generation service 101 or the interactive software experience 102, which may present such designs unchanged, or may modify them automatically (for example to make them more compatible with the current user's modules—e.g. to match skin color) or combine multiple other users designs in a "mashup". Once a user has generated a custom module using the method of FIG. 3, the virtual 3D shape which was generated by the user (and received in block 302) may be made available by the module generation service or the interactive software experience to other users so that other users can generate a virtual 3D shape based on some or all of the virtual 3D shape generated by the first user (and received in block 302).

In various examples, the module generation service 101 may provide a mechanism for collecting payment from users (in real or virtual currency) in return for generating a custom module. For example, a user may pay $10 or 10,000 in game coins to receive a custom module generated by the module generation service 101. Where a virtual currency within the interactive software experience is used to pay for generation of a custom module, the operator of the interactive software experience may pay the real amount (e.g. $10) for generation of the module. Where a real currency is used, the transaction may take place within the module generation service 101 or, as described above, where the user collects the module from the location of a 3D printer (which may be in a shop), the transaction may be implemented there.

In various examples, the module generation service 101 may provide a mechanism for passing payment to those users who make their virtual 3D shape available for use by others and/or for those users whose virtual 3D shape is used by others in generating their own custom module (e.g. payment per virtual use or per physical module generated). In other examples, however, instead of providing payment, users may be provided with other rewards (e.g. points, incentives, etc.) where they share a 3D shape they have created and/or where another user re-uses some or all of their 3D shape.

Figure 5:
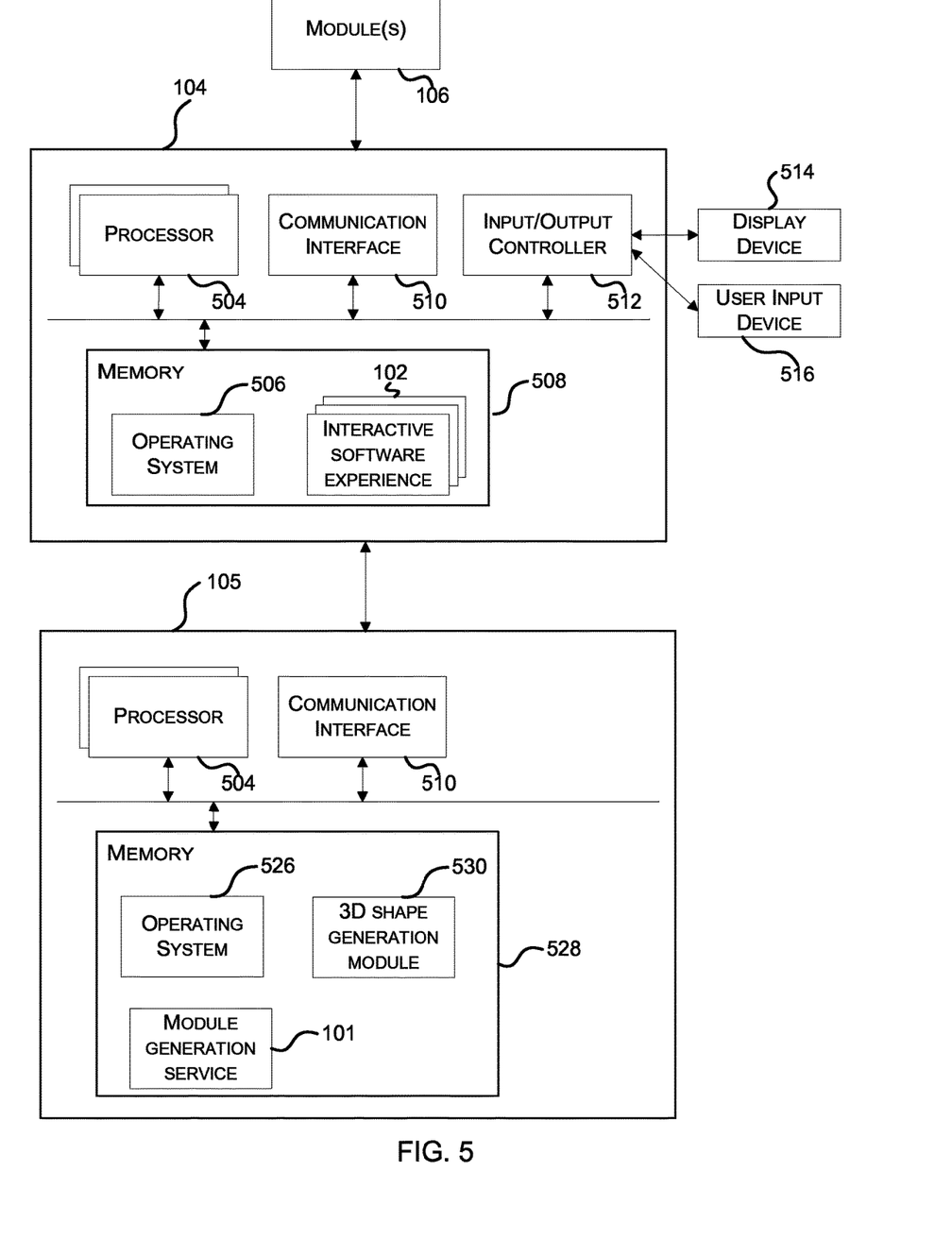
FIG. 5 illustrates two exemplary computing-based devices in which embodiments of the methods described herein may be implemented.

FIG. 5 illustrates various components of two exemplary computing-based devices 104, 105. The first exemplary computing-based device 104 may be implemented as any form of a computing and/or electronic device and on which one or more interactive software experiences 102 may run. The second exemplary computing-based device 105 may be implemented as any form of a computing and/or electronic device and on which one or more module generation services 101 may be stored.

Computing-based device 104, 105 comprises one or more processors 504 which may be microprocessors, controllers or any other suitable type of processors for processing computer executable instructions to control the operation of the device in order to run the interactive software experience 102 or provide the module generation service 101. In some examples, for example where a system on a chip architecture is used, the processors 504 may include one or more fixed function blocks (also referred to as accelerators) which implement a part of the functionality in hardware (rather than software or firmware). Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

Platform software comprising an operating system 506 or any other suitable platform software may be provided at the computing-based device to enable application software, such as the interactive software experience 102 or module generation service 101 to be executed on the device. The application software on either or both computing-based devices 104, 105 may further comprise a 3D shape generation module 530 which enables a user to generate a virtual 3D shape for input to the module generation service 101. Alternatively, as described above, the 3D shape generation module 530 may be integrated within the interactive software experience 102 or the module generation service 101 or may be provided on another computing-based device (not shown in FIG. 5).

The computer executable instructions may be provided using any computer-readable media that is accessible by computing based device 104, 105. Computer-readable media may include, for example, computer storage media such as memory 508, 528 and communications media. Computer storage media, such as memory 508, 528, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media.

Although the computer storage media (memory 508, 528) is shown within the computing-based device 104, 105 it will be appreciated that the storage may be distributed or located remotely and accessed via a network or other communication link (e.g. using communication interface 510). The communication interface 510 enables the computing-based device 104 to communicate with modules 106 and the two computing-based devices 104, 105 to communicate with each other, either directly or via a network or intermediary device. The communication interface 510 may use wired or wireless technology.

The computing-based device 104 also comprises an input/output controller 512 arranged to output display information to a display device 514 which may be separate from or integral to the computing-based device 104. The display information may provide a graphical user interface. The input/output controller 512 may also be arranged to receive and process input from one or more devices, such as a user input device 516 (e.g. a mouse, keyboard, camera, microphone or other sensor). In some examples the user input device 516 may detect voice input, user gestures or other user actions and may provide a natural user interface (NUI). This user input may be used to select or control the interactive software experience 102 and/or to generate the virtual 3D shape which is input to the module generation service 101. In various embodiments the display device 514 may also act as the user input device 516 if it is a touch sensitive display device. The input/output controller 512 may also output data to devices other than the display device, e.g. a locally connected printing device (not shown in FIG. 5).

Any of the input/output controller 512, display device 514 and the user input device 516 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Although the present examples are described and illustrated herein as being implemented in a system as shown in FIGS. 1 and 4, the system described is provided as an example and not as a limitation. As those skilled in the art will appreciate, the present examples are suitable for application in a variety of different types of systems including gaming systems (e.g. where the interactive software experience is a game).

Although FIGS. 1 and 4 show the module generation service 101 and interactive software experience 102 as separate entities, in various examples, the module generation service 101 may be integrated within the interactive software experience 102 or there may be links from within the interactive software experience 102 to the module generation service 101.

The methods described herein may be used to generate one off items for a particular user. In other examples, the methods described herein may be used to generate a category of objects (for one user or for a group of users) rather than a single object.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset (i.e. such that a subset cannot comprise the entire set).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A system comprising a computing-based device, the computing-based device comprising:
   a communication interface arranged to communicate with an interactive software experience; and
   a module generation service arranged to:
   receive a virtual 3D shape generated by a user;
   generate a derived 3D shape for a custom modular object from the received virtual 3D shape, wherein the custom modular object can be connected to other modular objects to form a coherent physical whole object, the coherent physical whole object acting as a user input device for the interactive software experience;
   trigger sending of the derived 3D shape to the user in virtual or physical form, sending the derived 3D shape to the user in virtual or physical form being based at least in part on a location of the user; and
   provide a virtual representation of the custom modular object to the interactive software experience.

2. The system according to claim 1, wherein the virtual 3D shape comprises a connecting region and wherein generating a derived 3D shape for a custom modular object from the received virtual 3D shape comprises:
   modifying the connecting region of the virtual 3D shape to generate a derived 3D shape which is compatible with other modules to which the custom modular object can be connected to form a coherent physical whole object.

3. The system according to claim 2, wherein modifying the connecting region of the virtual 3D shape to generate a derived 3D shape which is compatible with other modules to which the custom modular object can be connected to form a coherent physical whole object comprises:
   checking the received virtual 3D shape against a set of predefined design rules; and
   in response to the virtual 3D shape violating a design rule, modifying the virtual 3D shape.

4. The system according to claim 2, wherein modifying the connecting region of the virtual 3D shape to generate a derived 3D shape which is compatible with other modules to which the custom modular object can be connected to form a coherent physical whole object comprises:
   forming an orifice in the connecting region of the virtual 3D shape to generate the derived 3D shape, the orifice being of a size and shape to receive a connector and/or an electronics core.

5. The system according to claim 1, wherein generating a derived 3D shape for a custom modular object from the received virtual 3D shape comprises:
   segmenting the virtual 3D shape into two or more parts; and
   generating a derived 3D shape for each of the two or more parts of the virtual 3D shape, wherein each derived 3D shape is compatible with other modules to which the custom modular object can be connected to form a coherent physical whole object.

6. The system according to claim 1, wherein triggering the sending of the derived 3D shape to the user in virtual or physical form comprises:
   transmitting the derived 3D shape to a 3D printer for generation of the derived 3D shape in physical form.

7. The system according to claim 6, wherein triggering the sending of the derived 3D shape to the user in virtual or physical form further comprises:
   selecting the 3D printer from a distributed network of 3D printers, the selection being based at least in part on a location of the user.

8. The system according to claim 6, wherein the triggering the sending of the derived 3D shape to the user in virtual or physical form further comprises:
   triggering the sending of the derived 3D shape in physical form to the user.

9. The system according to claim 6, wherein the triggering the sending of the derived 3D shape to the user in virtual or physical form further comprises:
   inserting a connector and/or electronics core into the physical form of the derived 3D shape prior to triggering the sending of the derived 3D shape to the user.

10. The system according to claim 9, wherein providing a virtual representation of the custom modular object to the interactive software experience comprises:
    storing the virtual representation in the connector and/or electronics core.

11. The system according to claim 1, wherein the virtual representation comprises a visual representation of the custom modular object.

12. The system according to claim 1, wherein providing a virtual representation of the custom modular object to the interactive software experience comprises:
    storing the virtual representation in a data record in a central database.

13. The system according to claim 1, wherein the interactive software experience is a game and the coherent physical whole object comprises a modular toy.

14. The system according to claim 1, wherein the virtual 3D shape is generated automatically by the user as a result of interacting with the interactive software experience.

15. The system according to claim 1, wherein the virtual 3D shape is generated by the user by artistic input.

16. A web browser application at least partially stored in memory and at least partially executed on a processor to control the system recited in claim 1.

17. A system comprising a computing-based device, the computing-based device comprising:
- a communication interface arranged to communicate with an interactive software experience; and
- a module generation service arranged to:
- receive a virtual 3D shape generated by a user;
- generate a derived 3D shape for a custom modular object from the received virtual 3D shape, wherein the custom modular object can be connected to other modular objects to form a coherent physical whole object, the coherent physical whole object acting as a user input device for the interactive software experience, generating the derived 3D shape for a custom modular object from the received virtual 3D shape comprising modifying a connecting region of the virtual 3D shape to generate a derived 3D shape which is compatible with other modules to which the custom modular object can be connected to form a coherent physical whole object, modifying the connecting region of the virtual 3D shape comprising checking the received virtual 3D shape against a set of predefined design rules and, in response to the virtual 3D shape violating a design rule, modifying the virtual 3D shape;
- trigger sending of the derived 3D shape to the user in virtual or physical form; and
- provide a virtual representation of the custom modular object to the interactive software experience.

18. The system according to claim 17, wherein the computing-based device further comprises a processor and the module generation service comprising device-executable instructions stored in memory, which when executed by the processor cause the computing-based device to:
- receive the virtual 3D shape generated by the user;
- generate the derived 3D shape for a custom modular object from the received virtual 3D shape;
- trigger the sending of the derived 3D shape to the user in virtual or physical form; and
- provide the virtual representation of the custom modular object to the interactive software experience.

19. The system as claimed in claim 17 the module generation service being at least partially implemented using hardware logic selected from any one or more of: a field-programmable gate array, a program-specific integrated circuit, a program-specific standard product, a system-on-a-chip, a complex programmable logic device.

20. A system comprising:
- a 3D printer, the 3D printer being one of a plurality of 3D printers;
- the 3D printer being arranged to receive a virtual 3D shape generated by a user, the 3D printer being selected from the plurality of 3D printers based at least in part on a location of the user;
- the 3D printer being further arranged to generate a derived 3D shape for a custom modular object from the received virtual 3D shape, wherein the derived 3D shape is compatible with other modules to which the custom modular object can be connected to form a coherent physical whole object, the coherent physical whole object acting as a user input device for an interactive software experience, the interactive software experience having access to a visual representation of the custom modular object.

* * * * *